Feb. 19, 1963 C. O. PEDERSEN 3,078,106
IMPLEMENT CONNECTING MEANS
Filed July 18, 1960
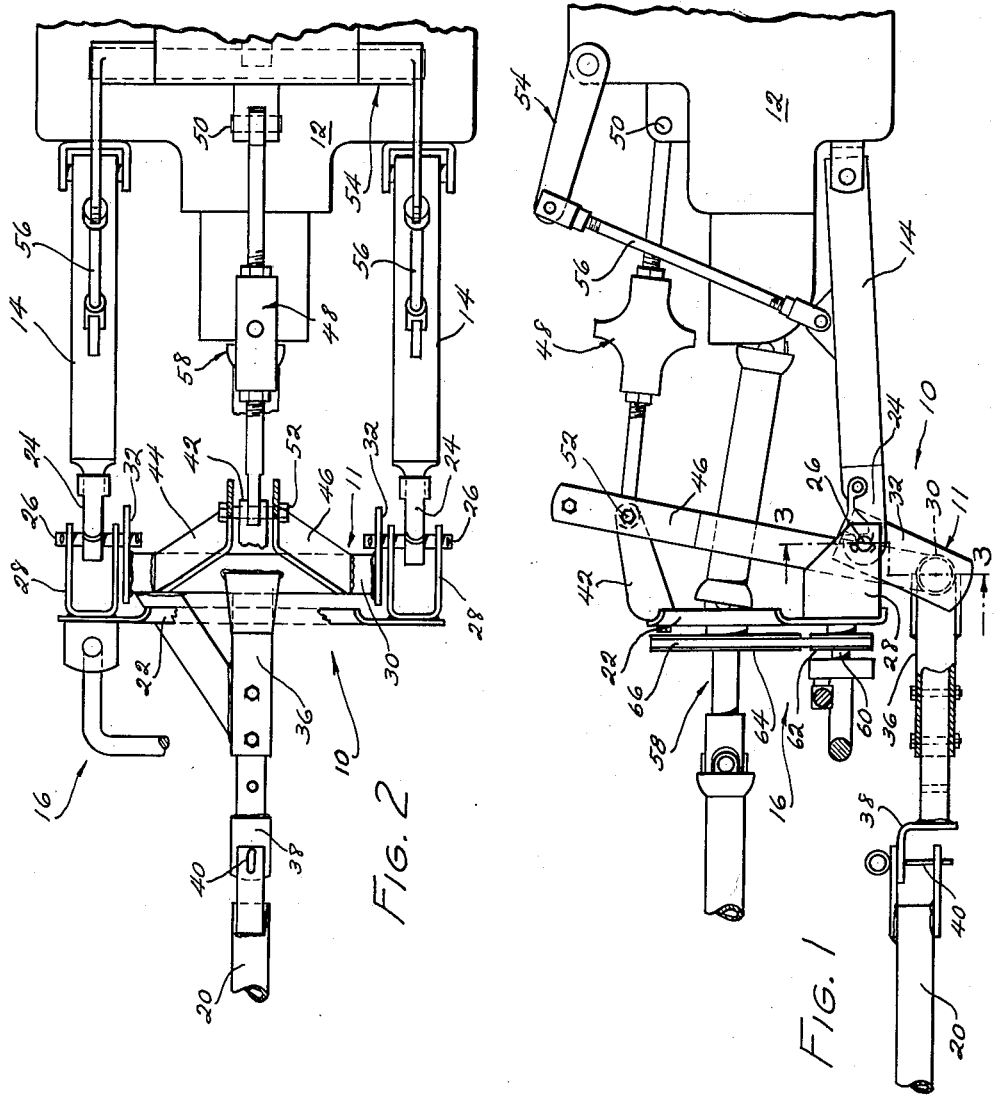
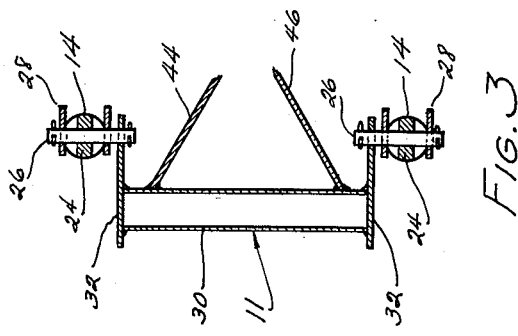
INVENTOR.
CARL O. PEDERSEN
BY

United States Patent Office

3,078,106
Patented Feb. 19, 1963

3,078,106
IMPLEMENT CONNECTING MEANS
Carl O. Pedersen, Burlington, Iowa, assignor to J. I. Case Company, Racine, Wis., a corporation of Wisconsin
Filed July 18, 1960, Ser. No. 43,354
4 Claims. (Cl. 280—460)

This invention relates to tractor drawn implements and particularly to a hitching assembly for connecting two separate implements to a tractor or other prime mover.

It has been the common practice where two implements are simultaneously drawn by a tractor, to provide a hitch assembly that is common to both implements. Thus it can be appreciated that any shocks originating in one implement may be transferred to the other and damage or unsatisfactory operation may result.

Accordingly, it is an object of this invention to provide a hitch assembly for connecting two implements to a tractor which prevents shock originating in one implement from being transferred to the other implement.

Further objects and advantages of the invention will become apparent from a consideration of the following detailed description taken in connection with the accompanying drawing wherein an embodiment of the invention is shown, however, it is to be understood that the invention is not limited to the details disclosed, but includes all such variations and modifications as fall within the spirit of the invention.

Referring to the drawing,

FIG. 1 is a fragmentary side elevational view of a tractor on which the hitch assembly of the present invention is mounted.

FIG. 2 is a fragmentary plan view of the arrangement shown in FIG. 1 with parts removed.

FIG. 3 is a sectional view taken at 3—3 of FIG. 1.

A practical embodiment of the hitch assembly of the present invention is indicated at 10 in FIGS. 1 and 2. The assembly 10 is mounted on a tractor 12 by means of draft links or connecting means 14 which are connected to the tractor, and comprises a drawbar 11, a mower or implement frame 22 also supported in links 14, and a draft tongue 20 of a trailing implement connected rearwardly to the drawbar frame 11.

Frame 22 is located in an upright position transversely of tractor 12 and adjacent draft links 14. Links 14 terminate in hitch jaws 24, each of which supports a transverse trunnion or hitch pin 26 to provide a common pivotal support for mower frame 22 and drawbar frame 11.

Jaws 24 are of the type shown in the patent to Seeburger, 2,681,813.

Frame 22 has brackets 28 secured thereto, one bracket being associated with each of said jaws 24, being pivoted thereto by means of the trunnion or pin 26.

Drawbar frame 11 includes a horizontal member 30 which is positioned adjacent frame 22 and which horizontal member terminates in pivot plates 32 which are welded or otherwise integrally secured to the member 30.

Plates 32 are provided with apertures to receive the trunnions or hitch pins 26, which extend inwardly from brackets 28 an amount sufficient to engage the apertures of plates 32 in the manner shown in FIG. 3. Conventional means is provided at the ends of pins 26 to prevent axial displacement of the latter from brackets 28 and plates 32.

A drawbar or draft member 36 extends rearwardly and is secured to horizontal member 30 by suitable means as by welding, and terminates in a hitch bracket 38 which has provision for attaching tongue 20 of the trailing implement by means of a pin 40.

A strut 42 is fixed to the upper portion of frame 22, extends toward tractor 12 and is anchored to drawbar frame 11 in a manner to be explained.

Upright members or masts 44 and 46 are provided which are welded or otherwise secured to transverse member 30 and converge upwardly, embracing strut 42.

A turnbuckle or central stabilizing link 48 extends from an anchor point such as 50 on tractor 12 to a pivot pin or bolt 52 which passes through suitable apertures in strut 42, uprights 44 and 46, and link 48, constituting a common hitch point for these elements. By means of this construction, it will be clear that frame 22 will be maintained in an upright position, and that the desired pivotal adjustments between tractor 12 and mower frame 22 can be made by lengthening or shortening link 48 in a well-known manner.

The vertical adjustment of the hitch assembly 10 relative to the ground is conventional and is done by means of a rockshaft assembly 54 which is part of tractor 12. Rockshaft assembly 54 is operated by the tractor controls and raises or lowers draft links 14 by means of tie-rods 56.

A power take-off shaft assembly 58 extends from tractor 12, is journaled in frame 22 and connects rearwardly to a trailing implement to provide power therefor.

Mower 16 is provided with a shaft 60 and a pulley 62. Shaft 58 has mounted thereon a pulley 64, and a belt 66 transmits power from shaft 58 to mower shaft 60.

It will be clear that this invention provides a hitch assembly for a plurality of implements drawn by a tractor and which assembly prevents destructive vibrations originating in one implement from being conveyed to the other implement.

When this hitch assembly is used, horizontal forces or shocks originating in the trailing implement, will be met by the tractor frame through draft links 14 and central link 48, while sudden shocks tending to raise or lower the hitch assembly 10 will be met by rockshaft assembly 54 through tie-rods 56. Thus no disturbing forces will be transmitted to the mower frame to cause damage or excessive wear of the mower parts.

The above being a complete description of an illustrative embodiment of the invention, what is claimed as new and desired to be secured by Letters Patent of the United States is:

1. In a hitch assembly for a tractor having transversely-spaced draft links and an upwardly-spaced central link, providing a hitch point spaced rearwardly from the tractor in combination an implement frame supported in an upright position by said draft links, a horizontal member spaced below and forwardly of said frame and supported by said draft links independently of said implement frame, an upright member secured integrally to said horizontal member and connected to said hitch point on said central link, a drawbar secured integrally to said horizontal member and extending rearwardly past said implement frame for trailing an implement, and strut means fixed on said implement frame and extending to and connected with said hitch point on said central link independently of said upright member, whereby the reactions of a trailing implement connected to said drawbar are isolated from said implement frame and transmitted directly to said tractor.

2. In a hitch assembly for a tractor having transversely spaced rearwardly-extending draft links, and an upwardly spaced rearwardly-extending central link providing a hitch point spaced rearwardly from the tractor, in combination an implement frame supported uprightly on said draft links, a drawbar frame spaced forwardly of said implement frame and supported on said draft links independently of said implement frame, a rearwardly-extending drawbar secured integrally to the mid portion of said drawbar frame and extending rearwardly past said implement frame, common means connecting said implement frame to said rearwardly extending draft links, and also connecting said drawbar frame to said draft links independently of said implement frame and common means connecting said implement frame to said hitch point on said central link, and also connecting said drawbar frame to said hitch point independently of said implement frame, whereby reactions of a trailing implement attached to said drawbar are isolated from the implement frame and transmitted directly to the tractor through said draft links and said central link.

3. In an implement connecting means for a tractor having a pair of transversely-spaced rearwardly-directed draft links provided with trunnions, and an upwardly-spaced central link, in combination an implement frame pivotally supported on said trunnions and having a forwardly-extending strut rigidly attached thereto, a drawbar frame spaced forwardly of said implement frame and comprising a horizontal member intermediate said draft links, pivot plates secured to each end of said horizontal member, said plates being pivoted on said trunnions and spaced from the pivotal support of said implement frame, a drawbar fixed to said horizontal member and extending rearwardly past said implement frame for attachment of a trailing implement, a mast member integrally secured to said horizontal member and extending upwardly, and means to pivotally secure said central link and said strut to said mast member.

4. In a dual implement hitch for use with a tractor of the type having a pair of lower laterally spaced draft links, and an upper central stabilizing link, the combination of a
hitch pin carried by each of said draft links, a pivot pin carried by said central stabilizing link, a draft frame extending transversely of said draft links, means on said draft frame extending to and engaged in supported relation with said hitch pins, an
upright, fixed to said draft frame, extending to and engaged with said pivot pin, a
drawbar fixed to said draft frame for connection with a trailing implement, a
mower frame,
means on said mower frame extending to and engaged in supported relation with said hitch pins independently of said draft frame, and a
strut fixed to said mower frame extending to and engaged with said pivot pin independently of said upright whereby the reactions of a trailing implement attached to said drawbar are isolated from the mower frame and transmitted directly to the tractor through said draft links and said stabilizing link.

References Cited in the file of this patent
UNITED STATES PATENTS

| | | |
|---|---|---|
| 2,341,807 | Olmstead et al. | Feb. 15, 1944 |
| 2,465,641 | Gardner | Mar. 29, 1949 |
| 2,640,708 | Fraga | June 2, 1953 |
| 2,662,783 | Sawyer | Dec. 15, 1953 |
| 2,703,954 | Preble | Mar. 15, 1955 |
| 2,919,143 | Gardner | Dec. 29, 1959 |